(No Model.) 3 Sheets—Sheet 1.

G. W. CRAIG.
WEIGHING SCALE.

No. 369,234. Patented Aug. 30, 1887.

WITNESSES:
Fred G. Dieterich
Colon C. Kemon

INVENTOR:
G. W. Craig
BY Munn & Co
ATTORNEYS.

(No Model.) 3 Sheets—Sheet 2.

G. W. CRAIG.
WEIGHING SCALE.

No. 369,234. Patented Aug. 30, 1887.

WITNESSES:
Fred G. Dieterich
Leon C. Kenron

INVENTOR:
G. W. Craig
BY Munn & Co.
ATTORNEYS.

(No Model.)  3 Sheets—Sheet 3.
G. W. CRAIG.
WEIGHING SCALE.
No. 369,234. Patented Aug. 30, 1887.
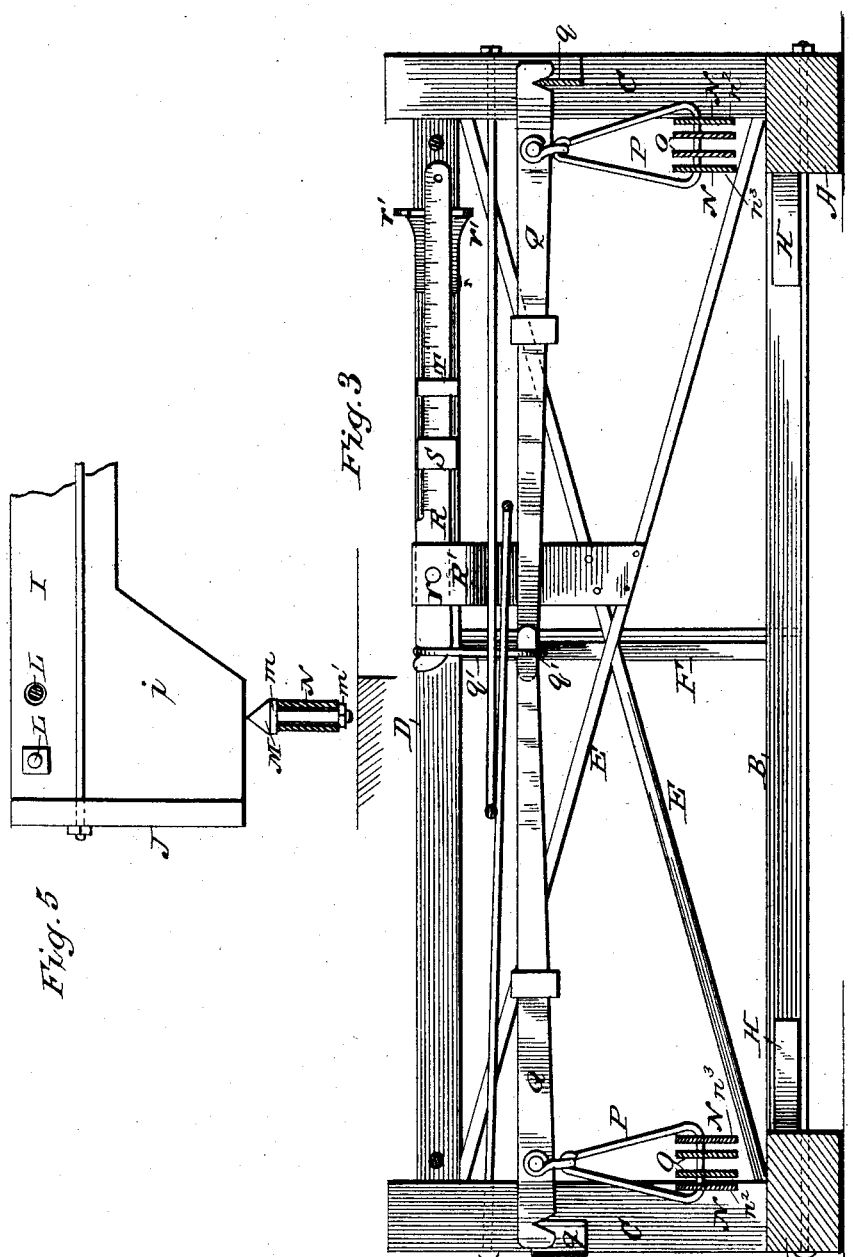
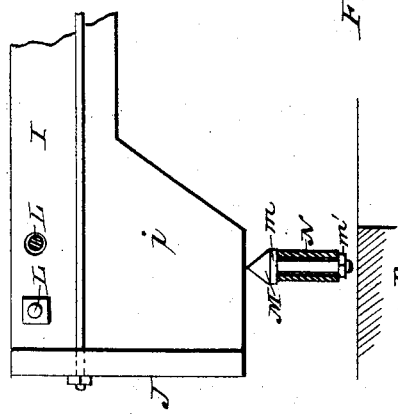
WITNESSES:
Fred J. Dieterich
John C. Kernon
INVENTOR:
G. W. Craig
BY Munn & Co.
ATTORNEYS.

UNITED STATES PATENT OFFICE.

GEORGE W. CRAIG, OF GRIMM'S LANDING, WEST VIRGINIA.

WEIGHING-SCALE.

SPECIFICATION forming part of Letters Patent No. 369,234, dated August 30, 1887.

Application filed April 25, 1887. Serial No. 236,091. (No model.)

*To all whom it may concern:*

Be it known that I, GEORGE W. CRAIG, a citizen of the United States, residing at Grimm's Landing, in the county of Mason and State of West Virginia, have invented a new and useful Improvement in Weighing-Scales, of which the following is a specification.

My invention relates to weighing-scales generally, and more particularly to scales for weighing heavy bodies, such as railway cars and locomotives, loaded wagons, live stock, &c.; and the object of my invention is to provide a frame-work and weighing apparatus of simple and cheap construction and accurate means for adjustment, and which can be built complete at the shop and transported bodily in condition for use.

The invention consists in certain improvements in construction, which will be hereinafter fully described and claimed.

Figure 1:
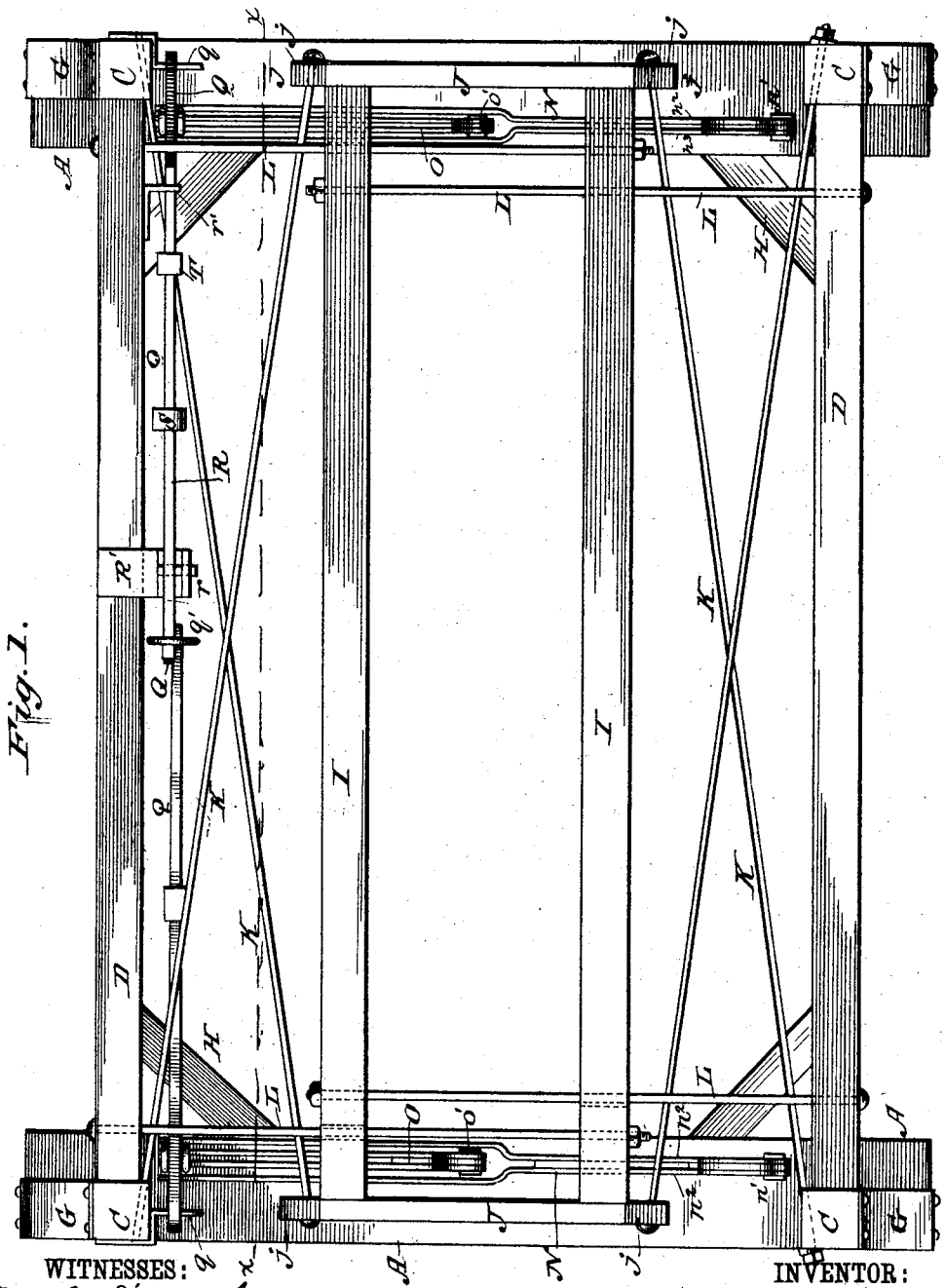
Figure 2:
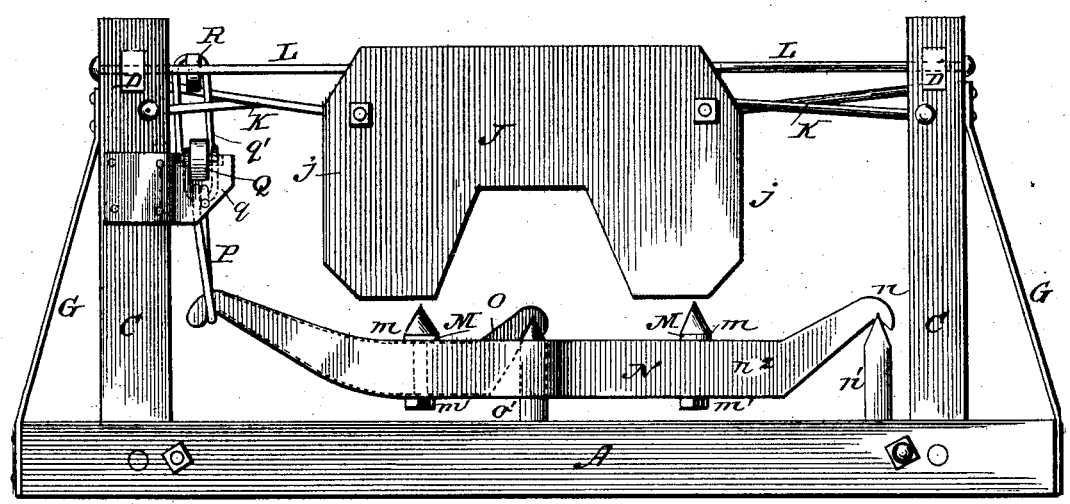
Figure 4:
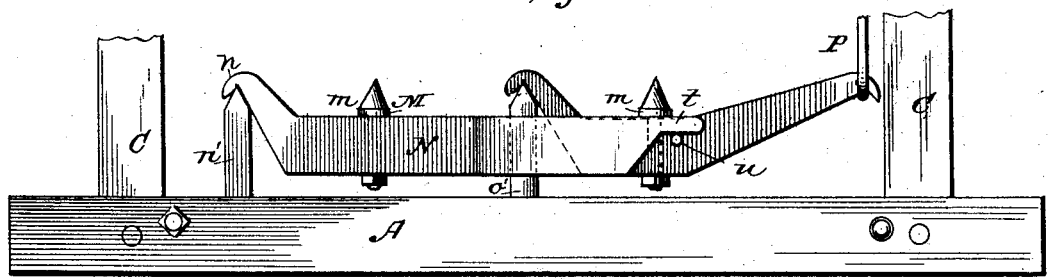

In the drawings, Figure 1 is a plan view. Fig. 2 is an end elevation. Fig. 3 is a longitudinal section on line $x\ x$ of Fig. 1, showing the weighing-beams in side elevation. Fig. 4 shows a modified construction of the platform levers or beams.

The frame-work which supports the weighing mechanism is composed of end sills, A A, formed from heavy timber, and two longitudinal beams, B B, mortised into said sills, and all forming a rectangular base. At each corner of the base is an upright, C, the two uprights on each side being connected by a longitudinal beam, D, at the top, and by diagonal beams E, while the longitudinal beams B and D are further braced by an upright, F. Diagonal braces G are also bolted to the upright C and sills A, as shown in Fig. 2. The end and side sills may also be braced at each corner, as shown at H, Fig. 1. This construction produces a very strong and rigid frame-work, which may be built at the shop and transported bodily, together with the weighing mechanism, now to be described.

The weighing-frame is composed of two heavy side beams, I I, and two end pieces, J J. At each end of the side beams, I I, are downwardly-projecting extensions $i$, which form the bearing-surfaces. The end beams, J, extend a short distance beyond the side beams, as shown at $j$. (See Figs. 1 and 2.) The frame may support a platform, or track-rails may be laid directly upon the beams I I. The weighing-frame is suspended by a system of yielding tension-rods. (Fully shown in Fig. 1.) Of these rods four extend in a general longitudinal direction relatively to the frame and four directly transverse. The longitudinal rods K K K K connect the end beams of the weighing-frame to the uprights of the main frame on each side, being headed in the upright and secured by a nut in the end beam, whereby the tension may be regulated. The transverse tie-rods L L L L are situated in pairs near opposite ends, and are headed in the upper sill of the main frame, two on each side. Each rod L extends through both of the side beams of the weighing-frame, and has a nut at its end for securing it firmly and maintaining the proper tension. The weighing-frame is thus supported firmly, as far as any horizontal movement is concerned, but is permitted to yield when subjected to a load, as in operation. The weighing-frame rests upon bearings M, which are pins, each secured in the slotted platform-levers N and O by means of an enlarged and beveled head, $m$, and a tightening-nut, $m'$, by means of which all the bearings may be accurately adjusted to the platform. The platform-lever N is pivoted by means of its hooked end $n$ upon a vertical pin, $n'$, in the end sill of the main frame.

The slotted lever itself is composed of two bars, $n^2\ n^3$, connected at the pivoted end and diverging near the middle to inclose the second lever, O. The second lever, O, is of about half the length of the first, and is similarly pivoted upon a pin, $o'$, placed near the middle of the end sill, and the free ends of both levers are supported by a stirrup, P, suspended from one of the intermediate scale-beams, Q Q.

It will be understood that the construction of the platform-levers is the same at both ends, and that the description thus far given applies to both.

It will be noticed that while the four slotted levers with movable pivot-bearings work in pairs and in perfect harmony, yet each lever works independently of the others, and a pressure on any one of the pivots is communicated directly to the weighing-beam without any direct effect on its fellow lever on the opposite pair of levers. The weight is transmitted to the scale-beam through the intermediate beams, Q Q, before mentioned. Each of these beams is supported at one end upon a knife-edged rest, $q$, attached to the main frame, and the free end of each rests in a stirrup, $q'$, suspended from the scale-beam R, such ends being wholly disconnected from each other.

The stirrups P are suspended from the beams Q at the proper distance from the pivot, and the resistance of the beams is regulated by a sliding counter-weight upon each. The scale-beam R is pivoted upon a pin, $r$, in a bracket, R', on the main frame, and vibrates between the stops $r'\ r'$. Its short arm supports the stirrups $q'$, in which the beams Q Q rest, and on its surface is marked a scale for pounds and fractions. It supports two sliding indicating-weights, S T, as shown, adapted to the respective scales, one to indicate tons and the other pounds and fractions.

I have shown in Fig. 4 a modified construction of the platform-levers, in which the longer lever, instead of extending to and being supported by the stirrup P, has its ends formed into extensions $t$, which rest on pin $u$, secured to the second lever, which alone is supported by the stirrup. In all other respects the construction is similar to that already described.

Having described my invention, I claim as follows:

1. The combination, with the stationary frame, of two end levers fulcrumed at the opposite ends of said frame, bearings on the upper sides of the several levers, two levers fulcrumed at their outer ends to one side of the frame and supporting the free ends of the end levers, and a scale-beam supporting the inner ends of the said side levers, with the weighing-frame resting at its ends upon the bearing on the end levers, substantially as set forth.

2. The combination of the main frame, the long levers N, and short levers O, fulcrumed on the ends of the frame at $n'\ o'$, respectively, and provided with the upward-extending bearings $m$, the levers Q', fulcrumed at their outer ends to the frame at right angles to the levers N O, the stirrups P, depending from the side levers, Q, and supporting the free ends of the levers N O, the scale-beam R, and the stirrup $q'$, connected to the inner end of said beam and supporting the inner or free ends of the side levers, Q, with the weighing-frame resting upon the four bearings $m$, substantially as set forth.

3. The combination, with the weighing frame or platform of a scale, of a pair of independently-pivoted and slotted levers at each end, each lever being provided with a bearing adjustably secured in its slot, substantially as set forth.

4. The combination, with the main frame and the scale-supporting levers, of the weighing-frame supported by said levers, the horizontal adjustable rods L, connecting the side beams of the weighing-frame with the main frame, and the oblique adjustable rods K, connecting the ends of the weighing-frame with the opposite ends of the main frame, substantially as set forth.

GEORGE W. CRAIG.

Witnesses:
C. B. WAGGENER,
A. E. CRAIG.